Patented May 17, 1932

1,858,521

UNITED STATES PATENT OFFICE

MARK E. PUTNAM, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING HALOGENATED HYDROCARBONS

No Drawing.     Application filed August 26, 1927.  Serial No. 215,765.

In the manufacture of halogenated hydrocarbons, the reaction between the hydrocarbon and the halogen is conducted under controlled conditions in a reaction zone, and the exit gases are then passed over to a water-absorber for the recovery of halogen acid therein. Such halogen acid carries considerable quantities of the vapors of the hydrocarbon, it being substantially saturated therewith on leaving the reaction zone. Moreover, non-absorbable gases inevitable in the system, such as nitrogen, oxygen, carbon dioxide, etc., also carry a considerable component of the hydrocarbon, so that in the average the total thus removed from the system is relatively large. Customarily, the aqueous acid made in the absorption system is submitted to decantation, whereby some condensed hydrocarbon may be separated from the aqueous acid, but a large proportion goes clear through and is vented at the end of the system. The method of recovery of the hydrocarbon by trapping and decanting from the aqueous acid, in so far as it can be practiced, is unsatisfactory, since it requires that the temperature of the acid absorption system be kept low enough to condense hydrocarbon there. Moreover the presence of the hydrocarbon is a detriment to the acid absorption system since it prevents effective contact between the acid gas and the water. In order to in any way compensate for such poor action in the absorber, very large equipment has necessarily been resorted to. Besides all this, the acid so produced contains some hydrocarbon and this unfits it for certain uses. Rubber gaskets and such like luting also are unsatisfactory for use about the absorber system, on account of the softening or solution by hydrocarbon carried in the gases. A satisfactory procedure eliminating such hydrocarbons from the absorber system, is accordingly highly desirable.

To the accomplishment of the foregoing and related ends, the invention, then, consists of the features hereinafter fully described, and particularly pointed out in the claims, the following description setting forth in detail certain features embodying the invention, such being illustrative however of but one of the various ways in which the principle of the invention may be employed.

In proceeding in accordance with my invention, the hydrocarbon and the halogen are subjected to reaction conditions under controlled temperature in a reaction zone, and the exit gases are then scrubbed in a suitable solvent for the hydrocarbon, and the gas is in turn absorbed in water. While suitable for a considerable range of hydrocarbons and direct-acting reagents, where there is a production of an acid gas by-product, and the carrying away of portions of unreacted hydrocarbon or derivatives thereof, the process is of particular interest in connection with the halogenation of aromatic hydrocarbons. As scrubbing agent, a hydrocarbon or hydrocarbon derivative in particular may be employed, and most advantageously I use the halogenated hydrocarbon product itself resulting from the reaction, preferably a portion of this being diverted to a scrubber, and then being returned to the main bulk of the chlorinated hydrocarbon product. This may then be neutralized, and may be distilled, the absorbed hydrocarbon being then recovered. The scrubbing may be carried out in one step, or advantageously in more than one step, greater heat economy being thus possible as it becomes practicable to confine the use of very low temperature to the last step.

As a specific illustration of my process, benzene is treated with chlorine in the reaction zone under controlled temperature, and the exit gases are thence led to a scrubber. There may be used one or a series of scrubbers. I preferably arrange two in series. The first or both may be supplied with chlorinated oil withdrawn from the chlorination system preferably prior to the neutralization step, or the second scrubber may be supplied with the chlorinated oil, chiefly and preferably orthodichlor benzene taken from the product of distillation and No. 1 scrubber may be supplied with the unneutralized chlorinated oil as above described; or again, the second scrubber may be supplied with the dichlor product which may be then forwarded to No. 1 scrubber and from thence to the neutralizer. In all these cases the oil used for scrubbing is taken out of the production system and returned thereto along with the hydrocarbon and derivatives thereof absorbed by it in the scrubber system. The circulation of the scrubbing liquid is preferably a continuous one and the introduction of fresh oil and withdrawal of spent oil may be likewise made continuous.

In order to make the absorption step more effective the scrubbing liquors are cooled preferably, and a very effective recovery may be had by cooling the dichlor scrubbing agent in the second scrubber to a low point, say 0° C., or below, it being unnecessary to cool in the first scrubber to as low a point. In fact, cooling in the first scrubber may be done with available cooling water, whereas refrigeration of some sort will ordinarily, at least in summer, be required in No. 2 scrubber. Using a second scrubber in this manner limits the requirement for refrigeration. The acid gas leaving the scrubbers is now freed almost completely from its burden of hydrocarbon and chlorinated hydrocarbons and is in excellent condition for absorption in water without material waste of hydrocarbon at the vent or troublesome condensation in the absorption system.

An advantage of this system aside from the economies due to recovery of otherwise lost benzene and chlorine or avoidance of nuisance concerned lies in the use of the chlorinated product as scrubbing agent, enabling its return to the system. If other oils were used, separate neutralizing and distillation equipment would be required, whereas using the chlorinated product of the system no new neutralizing or distillation equipment is required, nor is any substantial increase in capacity required.

It will thus be seen that without interference, the so scrubbed acid gas may be absorbed efficiently, to the production of hydrochloric acid or other halogen acid, depending upon what agent has been used in the original reaction, and at the same time hydrocarbon which would otherwise have been but a nuisance and more or less waste, may be cleanly recovered. Moreover, foreign scrubbing agents need not be used, nor it is necessary to perform neutralization and the distillation steps other than those requisite with the main bulk of the product, since as seen the scrubber liquid can be simply diverted and returned in course to the main product. The hydrochloric acid or other acid produced is free from contamination also, and such acid is directly available, without recourse to particular refining operations.

Other modes of applying the principle of the invention may be employed, change being made as regards the details disclosed, provided the steps stated in any of the following claims, or the equivalent of such be employed.

I therefore particularly point out and distinctly claim as my invention:—

1. In a process of making halogenated hydrocarbons by treating a hydrocarbon with a halogen, the steps which consist in scrubbing the exit gases from the reaction with the liquid halogenated product thereof and distilling the resulting solution to recover unreacted hydrocarbon absorbed therein.

2. In a process of making halogenated hydrocarbons by treating a hydrocarbon with a halogen, the steps which consist in scrubbing the exit gases from the reaction with a cooled portion of the halogenated product thereof and distilling the resulting solution to recover unreacted hydrocarbon absorbed therein.

3. In a process of making halogenated hydrocarbons by treating a hydrocarbon with a halogen, the steps which consist in scrubbing the gases beyond the reaction zone with a cooled halogenated hydrocarbon in successively lower temperature stages, separating the hydrocarbon and returning the solvent to the scrubbing step.

4. In a process of making chlorinated benzene by treating benzene with chlorine, the steps which consist in scrubbing the gases beyond the reaction zone with chlorinated benzene, and distilling such chlorinated benzene, whereby absorbed benzene is recovered.

5. In a process of making monochlorobenzene by treating benzene with chlorine, the steps which consist in scrubbing the gases beyond the reaction zone with a solvent for benzene cooled in successively lower stages, and distilling such solvent, whereby absorbed benzene is recovered.

6. In a process of making monochlorobenzene by treating benzene with chlorine, the steps which consist in scrubbing the gases beyond the reaction zone with chlorinated benzene diverted from the end product, neutralizing such mixture, and distilling.

7. In a process of making monochlorobenzene by treating benzene with chlorine, the steps which consist in scrubbing the gases beyond the reaction zone with chlorinated benzene product cooled in successively lower stages, neutralizing, and distilling.

8. In a process of making monochlorobenzene by treating benzene with chlorine, the steps which consist in scrubbing the gases beyond the reaction zone with some of the chlorinated benzene obtained in the product, and then with chlorinated benzene mixture containing dichlorobenzene cooled to a lower temperature, returning the last named mixture to the main product, neutralizing, and distilling.

9. In a process of making halogenated hydrocarbons by reacting a hydrocarbon with a halogen, the steps which consist in scrubbing the exit gases and vapors from the reaction with a liquid halogenated product thereof, adding the resulting solution to the main body of reaction product and recovering unreacted hydrocarbon from the mixture.

10. In a process of making halogenated hydrocarbons by reacting a hydrocarbon with a halogen, the steps which consist in scrubbing the exit gases and vapors from the reaction with a cooled absorbing agent consisting of a liquid halogenated product thereof, adding the resulting solution to the main body of reaction product and recovering unreacted hydrocarbon from the mixture.

11. In a process of making halogenated hydrocarbons by reacting a hydrocarbon with a halogen, the steps which consist in scrubbing the exit gases and vapors from the reaction in successive stages at progressively lower temperatures with a cooled absorbing agent consisting of a liquid halogenated product thereof, adding the resulting solution to the main body of reaction product and recovering unreacted hydrocarbon from the mixture.

Signed by me this 15 day of August, 1927.
MARK E. PUTNAM.